Figure 1:
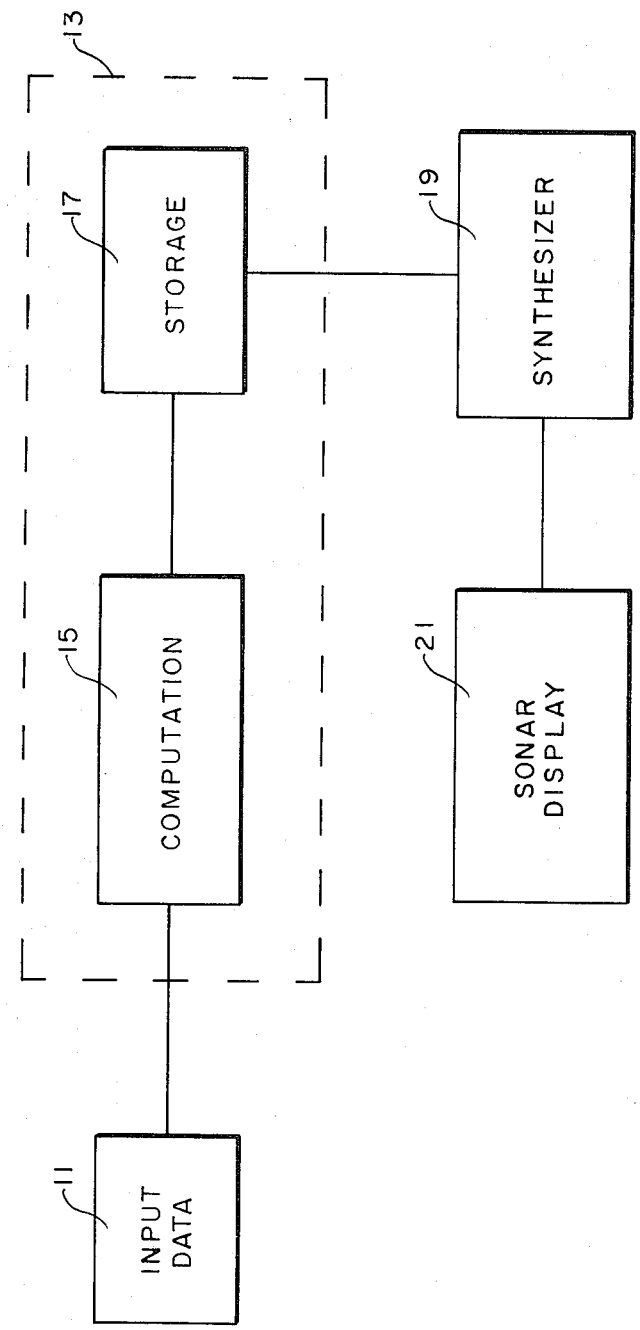

United States Patent
Rowe

[15] 3,676,565
[45] July 11, 1972

[54] TIME DOMAIN WAVEFORM SYNTHESIZING METHOD

[72] Inventor: John Joseph Rowe, Bowie, Md.
[73] Assignee: The Singer Company, New York, N.Y.
[22] Filed: Dec. 1, 1970
[21] Appl. No.: 93,979

[52] U.S. Cl. .............................................. 35/10.4, 324/77 B
[51] Int. Cl. .......................................................... G09b 9/00
[58] Field of Search .................. 35/10.4; 324/77 B; 179/15 A

[56] References Cited

UNITED STATES PATENTS 3,517,173  6/1970  Gilmartin et al. .................. 324/77 B X Primary Examiner—T. H. Tubbesing
Attorney—Francis L. Masselle, William Grobman and Charles S. McGuire

[57] ABSTRACT

A method of synthesizing time domain waveforms from data in the frequency domain with improved resolution in the middle and lower frequencies. Frequency data is broken down into groups and each group processed through an inverse Fourier or fast Fourier transform to obtain time domain data which is then added together in the proper time relationship. The resulting composite digital information is then passed through a digital to analog converter to provide an analog time domain waveform.

7 Claims, 2 Drawing Figures

INVENTOR.
JOHN J. ROWE
BY
*William Grotman*

TIME DOMAIN WAVEFORM SYNTHESIZING METHOD

This invention relates to data processing and more particularly to a method of synthesizing time domain waveforms from data in the frequency domain with improved resolution.

In many applications it is desirable to convert frequency domain information to the time domain. A useful tool to accomplish this task is the inverse Fourier transform. However, until the recent development of the fast Fourier transform, use of this tool in a computer has been impractical. The use of fast Fourier transform has been much written about in the literature recently. For example see *The Fast Fourier Transform* by E. O. Brigham and R. E. Morrow in IEEE Spectrum, December 1967 pp 63–70 and the references cited therein. However, with this method, to obtain high resolution at middle and lower frequencies requires a large number of points to be processed through the transform. For example, with frequencies over a range of 0.02 Hz. to 20,000 Hz. a 1,024 point transform will result in a resolution of only 200 Hz. To increase resolution requires a large increase in the number of points. The present invention solves this problem by breaking down the total frequency range into groups, processing each group separately and then adding the results for a final output. For example, the groups may be 0.02Hz. to 2Hz., 2Hz. to 20Hz., 20Hz to 200Hz., and 200Hz. to 20,000Hz. With a 1,024 point transform for each of the resulting resolutions are respectively 0.02Hz., 2Hz., 20Hz., and 200Hz. Thus a non-linear transform is provided with improved resolution at lower and middle frequencies.

An important application of this method which will help to demonstrate its usefulness is sonar simulation. Previously, in analog systems, separate sound generators were provided to simulate target ships, sea noise, marine life etc. The outputs were all added together and provided as an input to the sonar device. With the advent of the fast Fourier transform, however, it is now possible to store digital information relating to frequency and convert it to time domain information using fast Fourier transforms. This is particularly helpful since frequency data is relatively easy to compute and store whereas time domain data cannot be handled easily in the digital computer. But, in using a standard linear transform, it is found that, since most sonar devices display percentages of frequencies, a transform which has sufficient resolution for the lower frequencies is providing unnecessary resolution at higher frequencies and thus is inefficient. By breaking the frequencies into groups, as disclosed in the present application, the required resolution is obtained without using an overly complex transform of many points and thus computer time and storage are used more efficiently.

It is an object of this invention to provide a method of synthesizing time domain wave forms from data in the frequency domain with improved resolution in the lower and middle frequencies.

Another object is to provide a method of synthesizing time domain waveforms from frequency domain data using non-linear fast Fourier transform.

It is also an object to provide an improved means of simulating a sonar system by using fast Fourier transforms.

An additional object is to provide, in a sonar simulator, a signal in time domain which has been synthesized from frequency domain data in a manner which most efficiently makes use of computer time and storage.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

Figure 2:
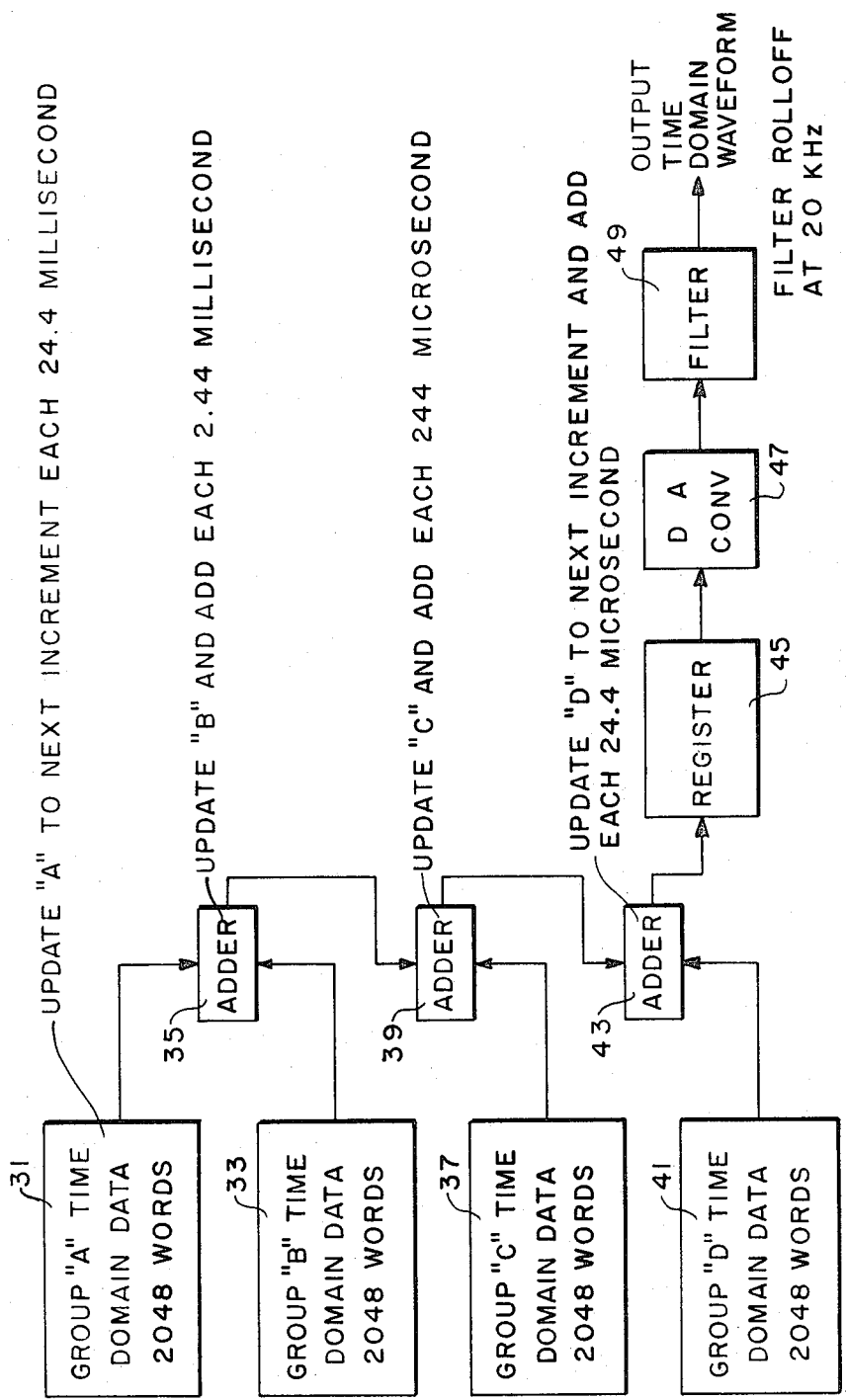

For a fuller understanding of the nature and objects of the invention reference should be had to the following detailed description taken in connection with the accompanying drawings, in which:

FIG. 1 is a block diagram of a sonar simulation system in which the present invention may be used; and FIG. 2 is a block diagram of the preferred embodiment of the present invention for recombining transform outputs to form a composite time domain waveform.

FIG. 1 shows the invention as embodied in a sonar simulator. Input data 11 is provided to computer 13 wherein it is processed in block 15 and stored in block 17. The input data will comprise such information as a target ship's speed, its distance from the sonar device, number and type of engines etc., marine life data, and data concerning sea state. This data will then be processed in equations contained in block 15 to obtain data relating to the frequency and amplitude of the sounds present at the sonar device. For example, as a ship comes closer the amplitudes of the frequencies associated with its engines will increase. This frequency data is then stored in conventional storage means within the computer represented by block 17.

From block 17 the frequency data is supplied to the synthesizer 19 which will be explained in detail below. Therein it is converted from frequency domain data, i.e., data defining the amplitude at each frequency, to time domain data, i.e., data defining the amplitude at each point in time. The time domain data is then supplied to sonar device 21 where it may be visually displayed and/or supplied as an audio signal for a trainee operating the device.

Although a single transform may be used to synthesize the time domain waveform, as previously noted the present invention provides a more efficient system by arranging the frequency data into groups. For example, if the total range is 0.2Hz to 20,000Hz. the data may be grouped as follows:

Group A — 0.02Hz. to 2Hz.
Group B — 2Hz. to 20Hz.
Group C — 20Hz. to 200Hz.
Group D — 200Hz. to 20,000Hz.

This grouping may be done with relative ease in the computer using well known programming methods. Each of the resulting groups may then be processed through an inverse fast Fourier transform by the computer in the manner described in the above referenced literature. A 1,024 point transform (sometimes referred to as a 2,048 point transform) is of a managable size for use in the computer.

The output from such transforms will be 2,048 words describing the digitized amplitude of a time domain waveform for the frequencies involved.

FIG. 2 shows how the present invention recombines the time domain data from the four groups to obtain a single time domain waveform containing all the required frequencies. The Group A time domain data indicated by block 31 is added to the group B data (block 33) in a digital adder 35.

Two words are required to define a cycle in the time domain. Although in group A the highest input frequency is 2Hz., one cycle of which will occur in 500 milliseconds, the transform covers the range of 0.02 to 20.48Hz. One cycle at 20.48 Hz. will take 48.8 milliseconds. And, since a word is provided every half cycle, each word will represent an amplitude for a time period of 24.4 milliseconds.

In group B, however, the frequency is 10 times that of group A and a new word is required every 2.44 milliseconds. Thus, a word in A will be added to 10 successive words in B before the next word from A is gated to the adder. The result from adder 35 is then added to a word form group C (indicated by block 37) in adder 39. Again, 10 successive words from group C will be added before a change occurs in the word from group B, and 100 group C words will be added before a change in the group A word. The result from adder 39 is added to the group D words (indicated by block 41) in adder 43 in the same manner. Group D words must be updated every 24.4 microseconds to cover the highest frequency. At each update the word from adder 43 is provided to register 45 which is the input to a D/A converter 47. In D/A converter 47 the digital word is converted to an analog signal for use in a video or audio device. Filter 49 is provided to reduce digitizing noise in the output. Since each word in group A is held for 24.4 milliseconds it will take 50 seconds for all the words to be used. Groups B, C and D will respectively require 5, 0.5, 0.05 seconds before all 2,048 words are used. Thus, the transforms for each of these groups must be done at these respective rates and the results used to update the words in block 31, 35, 37 and 41. In other words, the group A transform need only be done every 50 seconds while the group D transform must be done every 0.05 sec. Updating may be done at more frequency intervals but rates faster than 10 times the necessary minimum rate will not cause any appreciable change in the output. The above example is summarized in the following table.

| Code | Freq. Range Of Transform | Group Period | Resolution |
|---|---|---|---|
| A | 0.02 Hz.–20.48 Hz. | 50 sec. | 0.02 Hz. |
| B | 0.2 Hz.–204.8 Hz. | 5 sec. | 0.2 Hz. |
| C | 2 Hz.–2.048 KHz. | 0.5 sec. | 2 Hz. |
| D | 200 Hz.–20.48 KHz. | 0.05 sec. | 20 Hz. |

| F Input | Update Period Min. | | Word Increment Duration |
|---|---|---|---|
| 0.02–2Hz. | 50 sec. | 50 sec | 24.4 msec |
| 2 Hz.–20 Hz. | 0.5 sec. | 5 sec | 2.44 msec |
| 20 Hz.–200 Hz. | 0.05 sec. | 0.5 sec | 244 $\mu$sec |
| 200 Hz.–20.48 KHz. | 0.005 sec. | 0.05 sec | 24.4 $\mu$sec |

The example has been shown with each group's high frequency ten times that the preceeding group only as an example, in practice, when using a digital computer, multiples of eight might be more easily used as octal numbers may be processed more easily. Although the example of sonar simulation has been used the invention is equally applicable whenever a non linear inverse Fourier transform is required. Thus an improved method of synthesizing time domain waveforms from frequency domain data with increased resolution in the lower and middle frequencies which may be accomplished efficiently with easily managable transforms has been shown.

What is claimed is:

1. A method of transforming frequency domain data to time domain data with improved resolution in the middle and lower frequencies comprising:

a. segregating the frequency domain data into groups, each group containing a range of frequencies which is a portion of the total frequency range and storing said groups in a digital computer;

b. individually processing each group, in the computer, through an inverse Fourier transform to obtain groups of time domain data, the processing rate of each group being such that for a constant period of time data will be available for the total period from all groups, and storing said time domain data in said computer; and c. adding the time domain data from each of said groups to the other in the proper time sequence to obtain composite time domain data.

2. The invention according to claim 1 wherein the total frequency range is $a$ to $bx^n$, where $a$ is the lowest and $bx^n$ the highest frequency, $x$ a multiple between groups, and $n$ represents the number of groups plus 1, and the individual groups are $a$ to $b$, $ax$ to $bx$---$ax^{n-1}$ to $bx^{n-1}$ and $ax^n$ to $bx^n$; wherein the group $ax^n$ to $bx^n$ is processed $x^n$ times, $ax^{n-1}$ is processed $x^{n-1}$ time, and $ax$ to $bx$ is processed $x$ times each time $a$ to $b$ is processed once; and wherein one word of said $a$ to $b$ group is added to $x$ words of said $ax$ to $bx$ group and likewise one word of each successive group to x words of the following group to obtain said time domain data.

3. The invention according to claim 1 and further including the steps or providing the resulting composite time domain data in increments to a digital to analog converter to obtain a real time domain wave form.

4. The invention according to claim 1 wherein said Fourier transform is a fast Fourier transform.

5. In a training device wherein sound data is presented to a trainee, a method of generating sound data in the time domain comprising;

a. computing and storing frequency domain data relating to the sounds to be presented;

b. passing said frequency domain data through an inverse Fourier transform to obtain time domain data; and c. sequentially presenting said time domain data to the training device to form a real time time domain wave form.

6. The invention according to claim 5 wherein said time domain data is computed in digital form and converted to an analog form prior to presentation to said training device.

7. The invention according to claim 5 and further including the steps of breaking said frequency domain data into groups prior to passing said data through said transform and adding the resulting time domain data after passing through said transform whereby the resolution at middle and lower frequencies will be improved.

* * * * *